Aug. 23, 1966

C. VAN DER LELY ETAL  3,268,237
VEHICLE HAVING A FRAME SUPPORTED
BY GROUND WHEELS

Filed May 27, 1964

United States Patent Office 3,268,237
Patented August 23, 1966

3,268,237
VEHICLE HAVING A FRAME SUPPORTED BY GROUND WHEELS
Cornelis van der Lely, 7 Bruschenrain, Zug, Switzerland, and Ary van der Lely, 10 Weverskade, Maasland, Netherlands
Filed May 27, 1964, Ser. No. 371,878
Claims priority, application Netherlands, Oct. 14, 1954, 191,527
10 Claims. (Cl. 280—124)

The invention relates to a vehicle of the type having a frame which is supported by ground wheels. This application is a continuation-in-part of our divisional application, Ser. No. 11,367 which is derived from our prior application Ser. No. 539,910, filed Oct. 11, 1955, now U.S. Patent 2,936,034.

It is an object of the invention to provide a vehicle of the above-mentioned kind wherein the frame is movable in the direction of height and the wheels are resiliently coupled with the frame.

According to the invention there are adjusting means operatively associated with said wheels to adjust the same in the direction of height with regard to the frame and enclosures filled with a gas, said gas-filled enclosures permitting resilient movement of the wheels with regard to the frame.

The invention will be hereinafter more fully described with reference to the accompanying drawings in which some preferred embodiments of the device according to the invention have been illustrated by way of example and in which.

Figure 1:
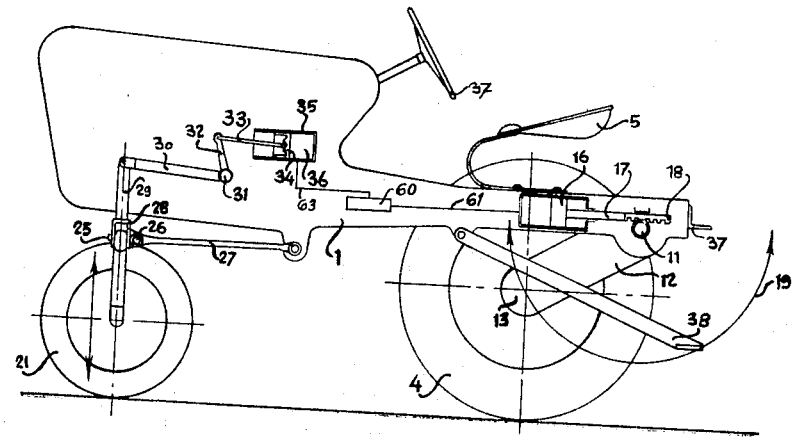
FIGURE 1 is a side elevational, partially sectional view of a vehicle according to the invention.
Figure 2:
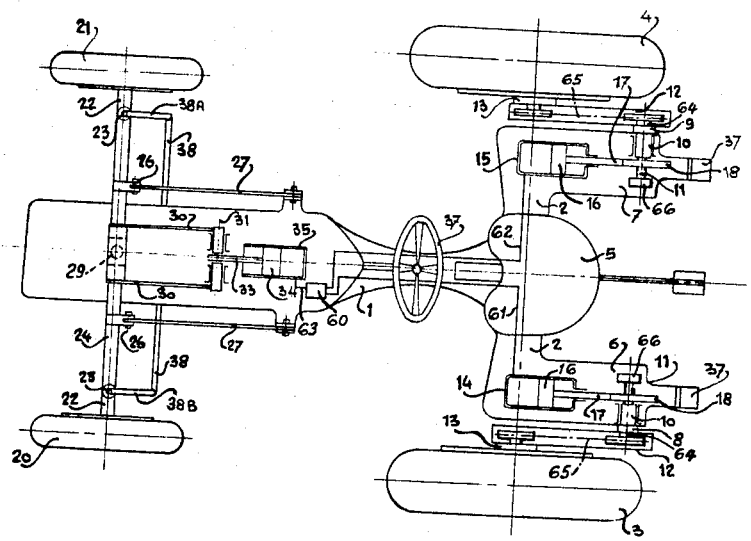
FIGURE 2 is a plan elevational, partially sectional view of the vehicle.
Figure 3:
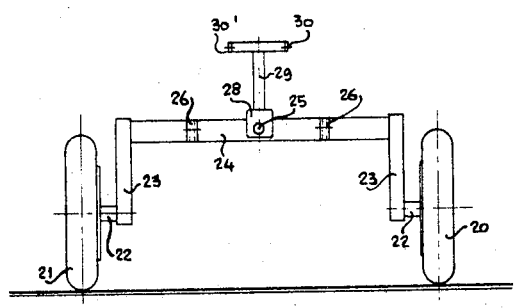
FIGURE 3 shows the connection of the front wheels of the vehicle in front elevation.
Figure 4:
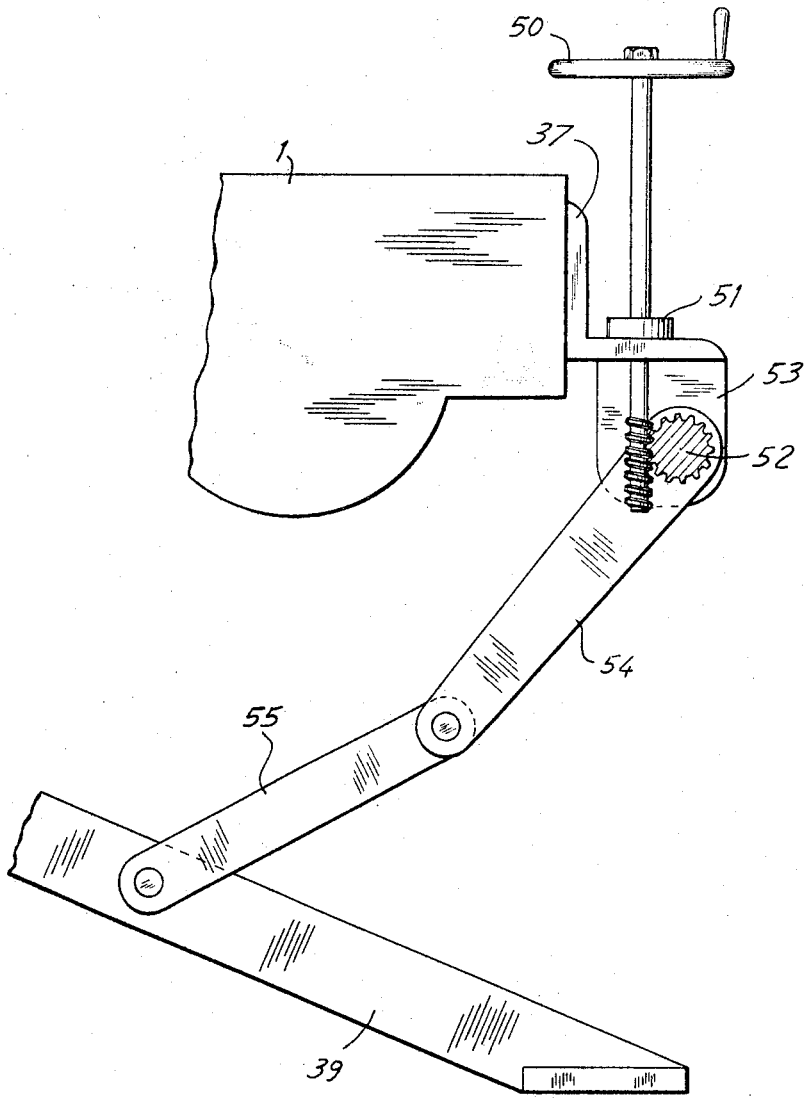
FIGURE 4 is a view on enlarged scale of the rear part of the tractor of FIG. 1, showing drawbar height control means.

In FIGS. 1 and 2, the illustrated embodiment of the invention is a tractor which has a frame 1 comprising a connecting member 2 for connecting the engine-driven rear wheels 3 and 4 to the frame. The connecting member 2, above which the driver's seat 5 is located, includes two parts 6 and 7 which extend longitudinally towards the rear of the vehicle. Crank shafts 8, 9, are respectively supported in the portions 6, 7. Said crank shafts are supported in bearings 10. At the crank shaft ends which are closest towards one another, toothed wheels 11 are provided. At the crank shaft ends which are furthest from one another are provided crank cheeks 12 on each of which a crank pin 13 is fixed. Crank pins 13 constitute axles of rotation for the rear wheels 3 and 4. The frame parts 6 and 7 are equipped with cylinders 14 and 15 in each of which a piston 16 is provided which is connected to a piston rod 17. The extremities of the piston rods 17 are formed as toothed racks 18 which cooperate with the toothed wheels 11. The driver of the tractor can, by known means, as for example, shown in U.S. Patent 2,901,051 admit or draw off pressure oil from the chambers in each of the cylinders 14 and 15, thereby placing each of the pistons 16 in any desired position. In this respect a pump 60 is connected to cylinders 14 and 15 by lines 61, 62 and to the cylinder 35 by line 63 so that oil delivered by the pump can be conveyed to the cylinders. The cylinders can be connected to a sump (not shown) for withdrawal of oil. The flow of oil in lines 61, 62, 63 or from the cylinders to the sump is controlled by the operator of the vehicle. By closing the supply lines 61, 62 and the outlets to the sump, a piston can be locked in any selected position. By withdrawing oil from the front portion of cylinder 15 in FIG. 1, piston 16 is advanced forwardly. The crank cheek 12 and the crank pin 13 attached thereto, will be pivoted from the position shown in FIG. 1 about an axis through tooth wheel 11 in a counter-clockwise direction. Thus the crank cheek and crank pin as shown in FIG. 1 will first be moved downwardly and then upwardly. In its final position, crank cheek 12 is horizontal and rearwardly directed. Path 19 in FIG. 1 describes the motion of crank pin 13. If oil is admitted to the front portion of cylinder 15, piston 16 is advanced rearwardly and crank cheek 12 is rotated in a clockwise manner. The final position of crank cheek 12 in this configuration is horizontal and forwardly directed. The cranks on each wheel can be guided separately, which has the advantage that the device can easily be driven transverse to the direction of the greatest slope over a steep mountain grade. The manner of driving the rear wheels is well known in the art as, for example, shown in U.S. Patent 2,559,758 and British Patent 480,969 and accordingly will be only briefly described hereinafter. The wheels 3 and 4 are driven via shafts 64 and chains 65. The shaft 64 is journalled in the hollow shaft 10; at one end of each shaft 64 there is fixed a toothed wheel 66 which forms part of the transmission between the motor of the vehicle and the wheels 3 and 4.

The front wheels 20 and 21 of the tractor are rotatable about the shafts 22, the steering pivot pins of which are supported in vertical elements 23. The upper ends of the elements 23 are interconnected by a connecting member 24, in the middle of which a pin 25 is situated. At both sides of the pin 25 forks 26 are located at the rear side of the connecting member 24. The foremost extremity of a bar 27 fits between the limbs of each fork 26, said foremost extremity being hingedly fixed to the fork by a hinged pin. The rear end of each bar 27 is hingedly fixed to the frame 1 of the tractor. The pin 25 extends in a substantially longitudinal direction and connects a fork 28 hingedly to the connecting member 24. The fork 28 constitutes the lower end of an arm 29, the widened upper end of which is hingedly connected to a pair of horizontal arms 30 of a bell crank. The arms 30 are rotatable about a horizontal axle 31, which is rotatably supported in the frame 1. The upwards extending arm 32 of the bell crank is hingedly connected to the foremost extremity of a bar 33, the rear end of which is hingedly connected to a piston 34 in a cylinder 35 which is fixedly mounted in the frame 1. Pressure oil can be admitted to the chamber 36 of the cylinder 35, whereby piston 34 can be put into any desired position. The piston can be secured in any position by statically maintaining the oil in the cylinder. Whereas arm 29 is always in the symmetrical plane of the tractor, the connecting member 24 can turn about the pin 25. The bars 27 prevent the connecting member 24 from moving out of a vertical plane perpendicular to the longitudinal axis of the tractor. The arm 29 causes the plane through the elements 23 to remain substantially vertical even when arms 30 are moved up and down by means of a movement of the piston 34. By such a movement, the front of the tractor will move upwards or downwards. The driver can control the direction of the front wheels 20 and 21 by means of the steering wheel 37 which works via a system of bars 38, 38A, 38B on the steering pivot pins of said wheels.

When the rear wheels are to occupy a prescribed height with regard to the frame, the crank pin 13, about which the rear wheels 3 and 4 are rotatable, can be positioned in two different configurations to satisfy this condition. In one position the crank pin is forward of a vertical plane through the shafts 11, and in the other position aft of said plane. Consequently, the driver can work with a small or a large wheelbase. The small wheelbase is shown in FIGS. 1 and 2. The small wheelbase has the advantage of affording a great maneuverability to the tractor, which is important while it is being transported from one location to another. On the other hand, the larger wheelbase reduces the tendency of the tractor to rear. This is not the only advantage of the great wheelbase. In positions having a larger wheelbase, a voluminous agricultural implement can be fixed to the central part of the frame 1 between the front and rear wheels, in which case the driver has an excellent view of the implement. Furthermore, a larger wheelbase is advantageous while driving up and down steep slopes, because the danger of a longitudinal upsetting is minimized. The device according to the present invention permits the choice of the more favorable wheelbase. The height of the agricultural implement above the ground is controlled by the positioning of pistons 16 and the piston 34. Furthermore, the height of the front and rear wheels with regard to the frame is also adjustable by positioning those pistons. If an agricultural implement is fixed to the frame between the front and rear wheels or to the front or rear end of the tractor, and if it is desired to put the agricultural implement out of operation, preferably the frame of the tractor will be uniformly raised. Fastening members 37, mounted on the parts 6 and 7 and drag bar 39 fixed to the frame 1, are provided for the fastening of an implement to the rear of the tractor.

It is desirable that the wheels of the tractor be resiliently supported by the frame. This can be achieved by inserting resilient elements into the mechanical transmissions between the pistons and the shafts of the wheels. A simpler construction is obtained by providing gas under pressure in elements E in the cylinders 14, 15 on both sides of pistons 16, as well as in cylinder 35 on either side of piston 34 to enable the pistons 17, 34 to oscillate about a respective center position with a fixed quantity of oil in each cylinder. Thereby, with a fixed quantity of oil in the cylinders, the pistons therein will be able to undergo displacement by compressing the gas in elements E. By so doing, a resiliency of the tractor on the wheels is obtained.

A particular advantage of the device according to the invention further consists in that the agricultural implements can be fastened immovably (though preferably easily detachably) to the frame. If the implement is provided with a driving shaft, this shaft consequently may be immovably supported with regard to the power take-off of the tractor, which means a great simplification with respect to the constructions with shafts having universal joints which are needed when the implement is movable with regard to the frame. A complete immobility is difficult for some agricultural implements while driving over a slanting terrain during which the rear wheels are adjusted at different heights in order to keep the tractor vertical. So as to be able to cause said agricultural implements to be parallel to the ground, they can be adjusted about the center line of the power take-off as an axis of rotation.

As previously specified, the drawbar 39 and the fastening members 37 are utilized for purposes of attaching an implement to the rear of the tractor. For such purposes, it is desirable that the drawbar 39 be controllable as to its height, in order to be correlated with the particular height position of the frame 1. For this purpose, there is employed a hand crank 50 which is supported in a bearing 51 on one of the fastening members 37. The crank 50 has a threaded end which is located beneath the members 37. A shaft 52 is supported in bearings 53 which are attached to members 37. The shaft 52 extends across the entire width of the tractor, spanning the distances between the members 37. The shaft 52 is freely rotatable in bearings 53. The shaft includes a threaded portion which is in engagement with the threaded portion of the crank 51, such that as the crank is turned in bearing 51, it causes rotation of shaft 52. Secured to shaft 52, at a central position thereof, is a link 54 which is pivotally connected to a further link 55, which in turn is pivotally connected to drawbar 39. Thus, as crank 50 is turned in one direction, it causes the shaft 52 to turn in a corresponding direction, which results in a raising or lowering of the drawbar 39. When the crank 50 is turned in the opposite direction, the drawbar is consequently moved in the opposite direction. There is thus provided a manual control which enables the driver to raise and lower the drawbar in accordance with the height of the frame 1.

Numerous modifications and variations of the disclosed embodiment will become apparent to those skilled in the art without departing from the scope of the invention as defined in the following claims.

What is claimed is:

1. A vehicle comprising a frame, wheels adapted for supporting said frame, arms, shafts pivotably connecting said arms to the frame, said wheels being rotatably attached to said arms, adjusting means operatively associated with each of said shafts to adjust the height of said wheels individually relative to the frame, said adjusting means each comprising a cylinder and a piston in said cylinder, each said piston and cylinder being substantially horizontal, each said piston being operatively coupled to one of said shafts, means for supplying a pressure fluid to each said cylinder for moving each piston in the associated cylinder and for maintaining the fluid in each said cylinder to maintain the positions of the pistons, the cylinders and arms being located on the same side of a vertical plane containing the axis of the associated shaft, said cylinders being between said wheels and a gas-filled enclosure means operatively connected to each of said cylinders for permitting limited movement of the respective said piston in each said cylinder in opposite directions for providing individual resilient movement of each of the wheels with respect to the frame in opposite directions.

2. A vehicle as claimed in claim 1 wherein each said piston has opposite sides defining opposite chambers in each said cylinder, said gas enclosure means including a gas filled enclosure located in each of the chambers of each cylinder adjacent opposite sides of the respective piston.

3. A vehicle as claimed in claim 1 comprising front wheels supporting said frame in addition to the first said wheels, means supporting said front wheels from said frame for movement in a vertical plane to adjust the height of the front wheels relative to the frame, adjusting means operatively associated with the means supporting the front wheels to raise and lower the front wheels with respect to the frame, the latter adjusting means including a cylinder and a piston slidable in said cylinder and coupled to the means supporting the front wheels, and gas filled enclosure means located in the last said cylinder to provide resilient movement of the front wheels with respect to the frame in opposite directions.

4. A vehicle as claimed in claim 3 wherein said means supporting the front wheels comprises a framework constituted by a pair of vertical elements each supporting a front wheel and a member connecting the vertical elements, and a pair of bars pivotally connected to the framework and to the frame and restricting the framework to a position in a vertical plane perpendicular to the longitudinal axis of the tractor.

5. A vehicle as claimed in claim 4 wherein said adjusting means includes a pair of bellcrank levers coupled to the piston and to the framework for raising and lowering the front wheels as the piston is moved back and forth in the cylinder.

6. A vehicle as claimed in claim 1 comprising connecting means on said frame for the connection of an implement to the frame, said vehicle further comprising a drag bar pivotally connected to the frame also for connection to the implement, and means on the frame coupled to the drag bar for adjusting the height thereof with respect to the frame.

7. A vehicle as claimed in claim 5 wherein said adjusting means further comprises a vertical arm connected to the framework to permit relative pivotal movement about the longitudinal axis of the tractor.

8. A vehicle as claimed in claim 3 wherein the wheels rotatably attached to the arms are rear wheels, said adjusting means for the rear wheels being operatively coupled to the arms to pivot the same relative to said frame along an arcuate path extending forwardly and rearwardly of axis of rotation of each of the rear wheels about said arms whereby the relative height and longitudinal positions of said frame and rear wheels are varied.

9. A vehicle as claimed in claim 8 wherein the piston in the cylinder associated with the front wheels has opposite sides defining opposite chambers in said piston, the gas filled enclosure means in the cylinder associated with the front wheels comprising a gas filled enclosure located in each of the chambers of the latter cylinder adjacent opposite sides of the piston in the latter cylinder.

10. A vehicle comprising a frame, wheels adapted for supporting said frame, arms pivotably connected to the frame for rotation about respective axes, said wheels being connected to the arms, adjusting means operatively coupled to the arms to pivot the same relative to said frame to effect relative movement between said wheels and frame along an arcuate path extending forwardly and rearwardly of said axes whereby the relative height and longitudinal positions of said frame and wheels are varied, each said adjusting means comprising a cylinder and a piston in said cylinder, said pistons and cylinders both being substantially horizontal, said pistons being coupled to said arms to pivotably move the same in accordance with movement of said pistons in said cylinders, means for supplying a pressure fluid to said cylinders to move the pistons in the cylinders and a gas-filled enclosure means operatively associated with said cylinders and permitting movement of the pistons while providing resilient movement of the wheels relative to the frame.

References Cited by the Examiner
UNITED STATES PATENTS

| | | | |
|---|---|---|---|
| 886,617 | 5/1908 | Lovejoy | 267—15 |
| 1,206,491 | 11/1916 | Wolf | 280—490 |
| 1,546,759 | 7/1925 | Silver | 267—67 |
| 2,559,758 | 7/1951 | De Jouette | 180—41 |
| 2,631,466 | 3/1953 | Deveson | 280—43.21 X |
| 2,644,699 | 7/1953 | Weiertz. | |
| 2,901,051 | 8/1959 | Thibodeau | 280—104 X |

BENJAMIN HERSH, *Primary Examiner.*

LEO FRIAGLIA, *Examiner.*

W. A. MARCONTELL, *Assistant Examiner.*